(12) United States Patent
Liguras

(10) Patent No.: US 7,028,455 B1
(45) Date of Patent: Apr. 18, 2006

(54) WEED CUTTER MOUNTING SYSTEM

(76) Inventor: Violet M. Liguras, 5085 Parkman Rd. North West, Warren, OH (US) 44481

(\*) Notice: Subject to any disclaimer, the term of this patent is extended or adjusted under 35 U.S.C. 154(b) by 0 days.

(21) Appl. No.: 11/005,370

(22) Filed: Dec. 6, 2004

(51) Int. Cl.
*A01D 34/03* (2006.01)
*A01D 34/44* (2006.01)
*A01D 34/66* (2006.01)

(52) U.S. Cl. .................................... 56/13.6
(58) Field of Classification Search ............ 56/13.7, 56/14.7, 16.7, 16.9
See application file for complete search history.

(56) References Cited

U.S. PATENT DOCUMENTS

| | | | |
|---|---|---|---|
| 4,152,882 A * | 5/1979 | Howard | 56/13.7 |
| 4,170,099 A | 10/1979 | Owens | |
| 4,242,855 A | 1/1981 | Beaver, Jr. | |
| 4,642,976 A * | 2/1987 | Owens | 56/16.9 |
| 4,870,811 A | 10/1989 | Steele | |
| D304,728 S | 11/1989 | Piorkowski | |
| 4,949,536 A | 8/1990 | Neufeld | |
| 5,303,532 A * | 4/1994 | Phillips | 56/12.7 |
| 5,413,329 A * | 5/1995 | Hirsch | 473/238 |
| 5,561,969 A * | 10/1996 | Sandy | 56/13.6 |
| 5,694,752 A * | 12/1997 | Warfield, III | 56/13.6 |
| 5,802,824 A * | 9/1998 | Aldrich | 56/13.7 |
| 5,809,758 A | 9/1998 | Flanigan et al. | |
| 6,032,443 A | 3/2000 | Aldrich | |
| 6,601,374 B1 * | 8/2003 | Smith | 56/13.6 |

\* cited by examiner

*Primary Examiner*—Árpád Fábián Kovács

(57) ABSTRACT

A weed cutter mounting system includes a riding lawn mower that includes a front wall, a back wall, a first side wall and a second side wall. A chair is mounted on the riding mower between the front and back walls. A plate is attached to the first side wall of the riding mower adjacent to and below the chair. A post is attached to the plate. A panel has an inner surface and an outer surface. The inner surface of the panel is attached to an outer end of the post. A coupler includes a base portion and a clamp portion. The base portion is rotatably coupled to the panel so that the base may be selectively rotated about an axis of the panel. The clamp portion is attached to the base. The clamp portion is adapted for removably receiving and securing a weed cutter to the riding mower.

6 Claims, 3 Drawing Sheets

WEED CUTTER MOUNTING SYSTEM

BACKGROUND OF THE INVENTION

1. Field of the Invention

The present invention relates to weed cutter mounting devices and more particularly pertains to a new weed cutter mounting device for supporting a weed cutting tool to a riding lawn mower in such a manner that the weed cutter may be used for cutting weeds, grass or other plants adjacent to the riding lawn mower.

2. Description of the Prior Art

The use of weed cutter mounting devices is known in the prior art. U.S. Pat. No. 6,032,443 describes a device for powering a weed cutter and mounting the weed cutter on a riding lawn mower. Another type of weed cutter mounting device is U.S. Pat. No. 4,170,099 having a bracket that is attachable to a lawn mower and which pivots a weed cutter from an upright position to a position that orientated the weed cutter along a vertical plane for cutting weeds adjacent to the lawn mower. A similar devices is found in U.S. Pat. No. 4,242,855 which provides and auxiliary drive for weed cutter.

While these devices fulfill their respective, particular objectives and requirements, the need remains for a device that includes a mounting for a weed cutter, otherwise known as a weed whip or weed whacker, so that the weed cutter is attached to a riding lawn mower. The mounting should be adapted for allowing a person to manipulate the positioning of a cutter portion of the weed portion with respect to the riding law mower without having to remove the weed cutter from the riding lawn mower.

SUMMARY OF THE INVENTION

The present invention meets the needs presented above by generally comprising a riding lawn mower that includes a front wall, a back wall, a first side wall and a second side wall. A chair is mounted on the riding mower and is positioned between the front and back walls. A plate has a first side and a second side. The first side of the plate is attached to the first side wall of the riding mower. The plate is positioned adjacent to and below the chair. A post is attached to and extends outwardly from the second side of the plate. A panel has an inner surface and an outer surface. The inner surface of the panel is attached to an outer end of the post. A coupler includes a base portion and a clamp portion. The base portion is rotatably coupled to the panel so that the base may be selectively rotated about an axis of the panel. The clamp portion is attached to the base. The clamp portion is adapted for removably receiving and securing a weed cutter to the riding mower.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
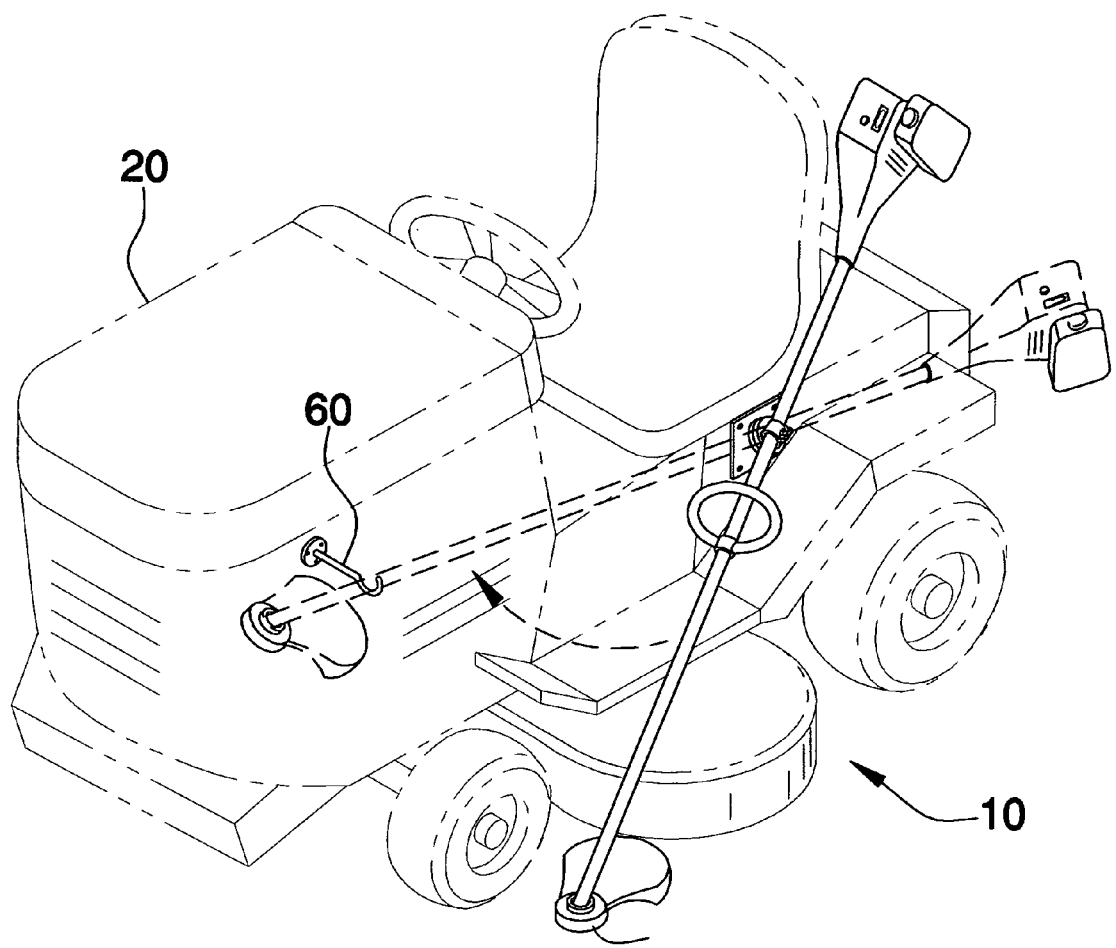
FIG. 1 is a perspective view of a weed cutter mounting system according to the present invention.
Figure 2:
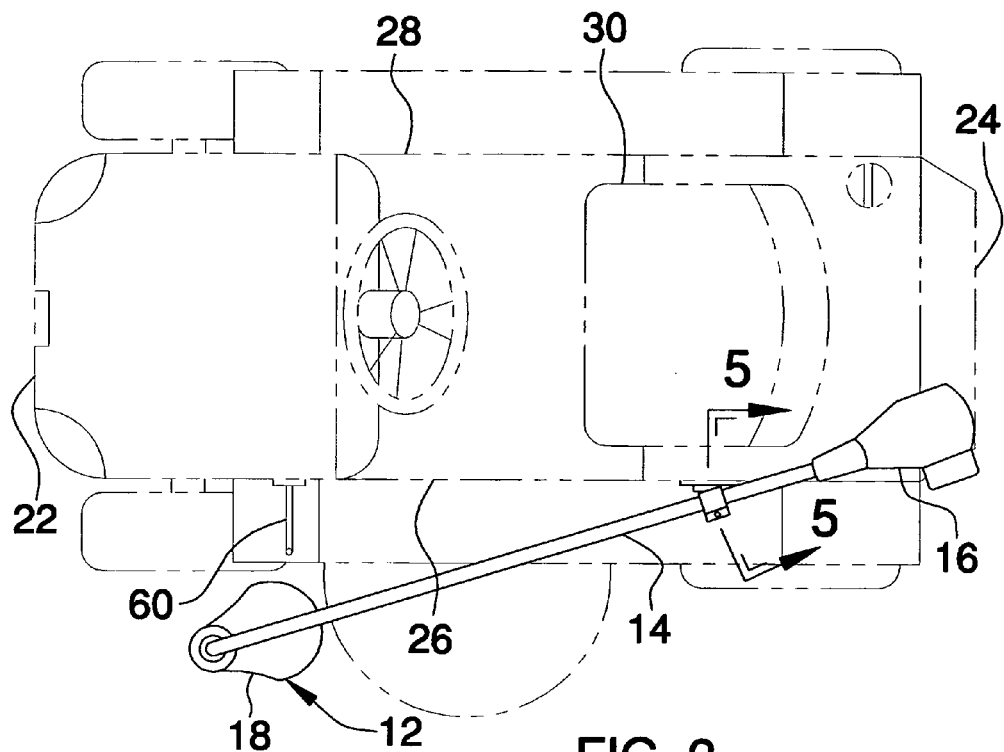
FIG. 2 is a top view of the present invention.
Figure 3:
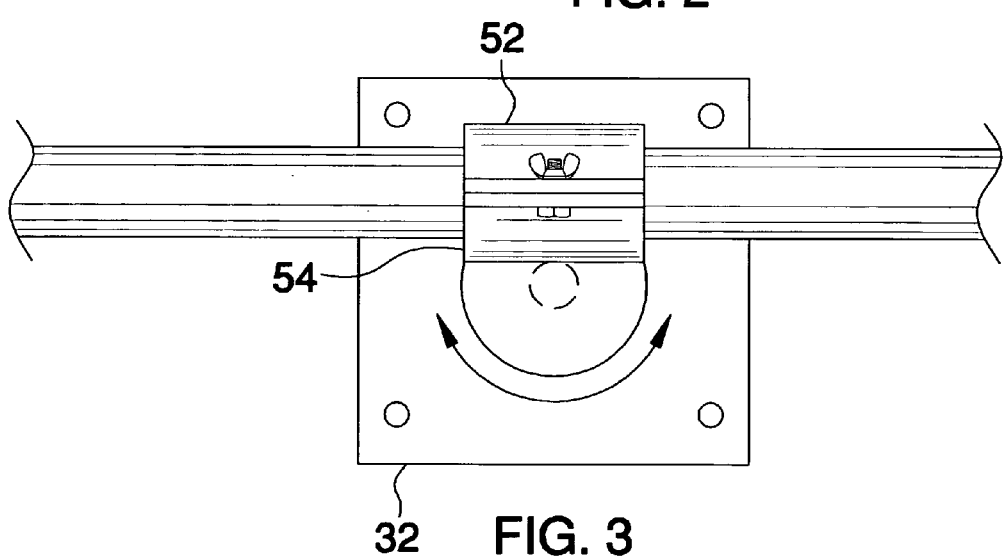
FIG. 3 is a side view of a coupler of the present invention.
Figure 4:
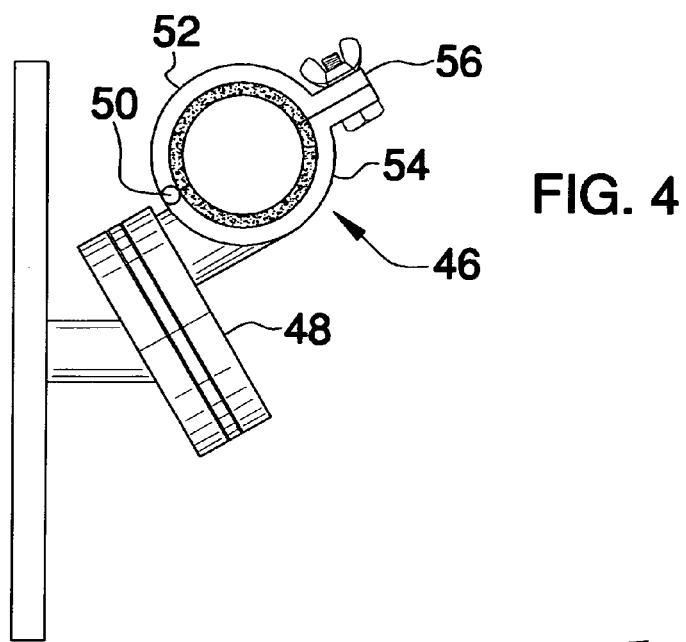
FIG. 4 is a front view of the coupler of the present invention.
Figure 5:
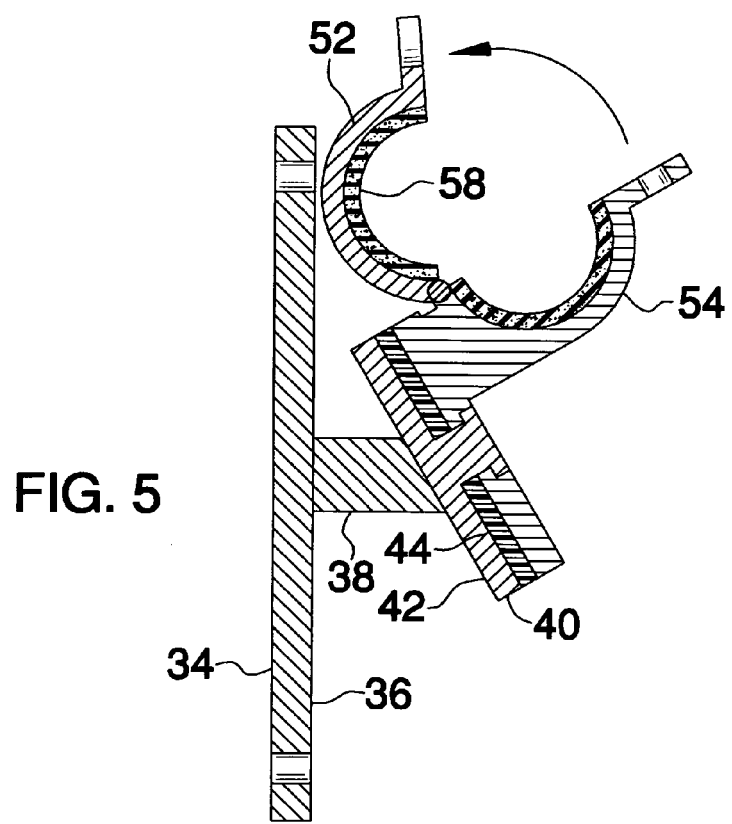
FIG. 5 is a cross-sectional view of the coupler of the present invention.

With reference now to the drawings, and in particular to FIGS. 1 through 5 thereof, a new weed cutter mounting device embodying the principles and concepts of the present invention and generally designated by the reference numeral 10 will be described.

As best illustrated in FIGS. 1 through 5, the weed cutter mounting system 10 generally comprises a system for holding a conventional weed cutter 12 during and before usage of the weed cutter 12. The weed cutter 12 includes an elongated, typically cylindrical, handle 14 that has an upper end having a motor 16 attached thereto and a lower end that has a cutting assembly 18 attached thereto. The system 10 includes a riding lawn mower 20 that has a front wall 22, a back wall 24, a first side wall 26 and a second side wall 28. A chair 30 is mounted on the riding mower 18 and is positioned between the front 22 and back 24 walls.

A plate 32 has a first side 34 and a second side 36. The first side 34 of the plate 32 is attached to the first side wall 26 of the riding mower 20, preferably with bolts. The plate 32 is positioned adjacent to and below the chair 30. A post 38 is attached to and extends outwardly from the second side 36 of the plate 32. The post 38 is orientated perpendicular to a plane of the second side 36 of the plate 32. A panel 40 has an inner surface 42 and an outer surface 44. The inner surface 42 of the panel 40 is attached to an outer end of the post 38. The post 38 is angled with respect to a plane of the inner surface so that the panel 40 is angled outwardly from the riding lawn mower 20. The angle between the post 38 and the panel 40 is between 40 degrees and 80 degrees.

A coupler 46 includes a base portion 48 and a clamp portion 50. The base portion 48 is rotatably coupled to the panel 40 so that the base portion 48 is may be selectively rotated about an axis of the panel 40. The clamp portion 50 is attached to the base portion 48. The clamp portion 50 includes a cylindrical shape that has an axis orientated parallel to a plane of the panel 40. The clamp portion 50 has a break therein so that first section 52 and a second section 54 of the clamp portion 50 are defined. The first section 52 is pivotally coupled to the second section 54 so that the first 52 and second 54 sections may be selectively positioned in a closed position or an open position. A fastener 56 is attached to the clamp portion 50 for selectively locking the clamp portion 50 in a closed position. The fastener 56 includes a pair of tabs each attached to one of the first and second sections and including alignable openings therein for removably receiving a pin, or securing member, for holding the tabs together. The clamp portion 56 is adapted for removably receiving and securing the weed cutter 12 to the riding mower 20. A resiliently compressible material 58 is attached to and covering an inner surface of the clamp portion 50. When the weed cutter handle 14 is positioned within the clamp portion 50, the resiliently compressible material 58, which is preferably an elastomer, aids in retaining the weed cutter 12 in the clamp portion 50.

A hook 60 is attached to the first side wall 26. The hook 60 is positioned between the chair 30 and the front wall 22. The weed cutter 12 may be positioned on the hook 60 so that the weed cutter 12 extends from the hook 60 to the coupler 46.

In use, a user of the system 10 places the weed cutter 12 in the clamp portion 50 as shown in FIG. 1. The user then rides the riding lawn mower 20 in a conventional manner. When a portion of lawn or landscaping adjacent to the riding lawn mower 20 needs to be cut but is not reachable with the lawn mower 20, the weed cutter 12 is turned on, but retained in the clamp portion 50. The rotatable nature of the base 48 allows the weed cutter 12 to be moved to locations as needed adjacent to the lawn mower 20.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A weed cutter support system for holding and supporting a weed cutter during and before usage of the weed cutter, the weed cutter including an elongated handle having an upper end having a motor attached thereto and a lower end having a cutting assembly attached thereto, said system comprising:
    a riding lawn mower including a front wall, a back wall, a first side wall and a second side wall, said first and second side walls being vertically orientated, a chair being mounted on said riding mower and being positioned between said front and back walls;
    a plate having a first side, a second side and a peripheral edge, said first and second sides being positioned opposite with respect to each other, said first side of said plate being attached to said first side wall of said riding mower, said plate being positioned adjacent to and below said chair;
    a post being attached to and extending outwardly from said second side of said plate;
    a panel having an inner surface and an outer surface, said inner surface of said panel being attached to an outer end of said post; and
    a coupler including a base portion and a clamp portion, said base portion being rotatably coupled to said panel such that said base may be selectively rotated about an axis of said panel, said clamp portion being attached to said base, said clamp portion being adapted for removably receiving and securing the weed cutter to said riding mower.

2. The system according to claim 1, wherein said post is orientated perpendicular to a plane of said second side of said plate and said post is angled with respect to a plane of said inner surface, said panel being angled outwardly from said riding lawn mower from an upper edge of said panel to a lower edge of said panel.

3. The system according to claim 1, wherein said clamp portion includes a cylindrical shape having an axis orientated parallel to a plane of said panel, said clamp portion having a break therein such that first section and a second section of said clamp portion is defined, said first section being pivotally coupled to said second section such that said first and second sections may be selectively positioned in a closed position or an open position, a fastener being attached to said clamp portion for selectively locking said clamp portion in a closed position.

4. The system according to claim 3, further including a resiliently compressible material being attached to and covering an inner surface of said clamp portion.

5. The system according to claim 1, further including a hook being attached to said first side wall, said hook being positioned between said chair and said front wall, wherein the weed cutter may be positioned on said hook such that said weed cutter extends from said hook to said coupler.

6. A weed cutter support system for holding and supporting a weed cutter during and before usage of the weed cutter, the weed cutter including an elongated handle having an upper end having a motor attached thereto and a lower end having a cutting assembly attached thereto, said system comprising:
    a riding lawn mower including a front wall, a back wall, a first side wall and a second side wall, a chair being mounted on said riding mower and being positioned between said front and back walls;
    a plate having a first side and a second side, said first side of said plate being attached to said first side wall of said riding mower, said plate being positioned adjacent to and below said chair;
    a post being attached to and extending outwardly from said second side of said plate, said post being orientated perpendicular to a plane of said second side of said plate;
    a panel having an inner surface and an outer surface, said inner surface of said panel being attached to an outer end of said post, said post being angled with respect to a plane of said inner surface such that said panel is angled outwardly from said riding lawn mower;
    a coupler including a base portion and a clamp portion, said base portion being rotatably coupled to said panel such that said base may be selectively rotated about an axis of said panel, said clamp portion being attached to said base, said clamp portion being adapted for removably receiving and securing the weed cutter to said riding mower, said clamp portion including a cylindrical shape having an axis orientated parallel to a plane of said panel, said clamp portion having a break therein such that a first section and a second section of said clamp portion is defined, said first section being pivotally coupled to said second section such that said first and second sections may be selectively positioned in a closed position or an open position;
    a resiliently compressible material being attached to and covering an inner surface of said clamp portion;
    a fastener being attached to said clamp portion for selectively locking said clamp portion in a closed position; and
    a hook being attached to said first side wall, said hook being positioned between said chair and said front wall, wherein the weed cutter may be positioned on said hook such that said weed cutter extends from said hook to said coupler.

* * * * *